United States Patent [19]

Kondo

[11] Patent Number: 4,971,296
[45] Date of Patent: Nov. 20, 1990

[54] VEHICLE SUSPENSION MECHANISM

[75] Inventor: Toshiro Kondo, Hatsukaichi, Japan

[73] Assignee: Mazda Motor Corporation, Hiroshima, Japan

[21] Appl. No.: 225,373

[22] Filed: Jul. 28, 1988

[30] Foreign Application Priority Data

Jul. 29, 1987 [JP] Japan ............................... 62-189874
Oct. 29, 1987 [JP] Japan ............................... 62-274279
Oct. 29, 1987 [JP] Japan ............................... 62-274280

[51] Int. Cl.$^5$ ...................... B60G 15/00; B62D 17/00
[52] U.S. Cl. .................................. 267/220; 280/661; 280/668
[58] Field of Search ..................... 267/33-35, 267/220, 221, 258, 141.2-141.5; 280/661, 668, 692, 716, 697

[56] References Cited

U.S. PATENT DOCUMENTS

| 2,375,105 | 5/1945 | Hile | 267/141.3 |
| 3,999,779 | 12/1976 | Bishop | 280/661 |
| 4,753,455 | 6/1988 | Murakami et al. | 280/675 X |
| 4,756,517 | 7/1988 | Kakimoto | 280/668 X |
| 4,779,855 | 10/1988 | Tanaka | 267/221 X |

FOREIGN PATENT DOCUMENTS

| 0174007 | 3/1986 | European Pat. Off. |
| 0246116 | 11/1987 | European Pat. Off. |
| 6164506 | 5/1984 | Japan |
| 60-56616 | 4/1985 | Japan |
| 61-77504 | 4/1986 | Japan |
| 2135945 | 9/1984 | United Kingdom |

Primary Examiner—Robert J. Oberleitner
Attorney, Agent, or Firm—Fleit, Jacobson, Cohn, Price, Holman & Stern

[57] ABSTRACT

A vehicle suspension mechanism including a strut assembly connected with a vehicle body at an upper end portion and with a wheel at a lower end portion, a damper axis along which a shaft of the strut assembly is displaced for a damping effect being extended oblique to a kingpin axis about which the wheel is steered so that the shaft means damper shaft is inclined when the wheel is steered to produce a pivotal movement of the kingpin axis around the damper axis. The improvement comprises conversion member provided at the upper end portion of the strut assembly for converting the inclination of the shaft produced during the steering action of the wheel to a displacement in a transverse direction of the vehicle at the upper end of the strut assembly so that a negative camber angle change is produced in the wheel located outer side of the steering action.

25 Claims, 10 Drawing Sheets

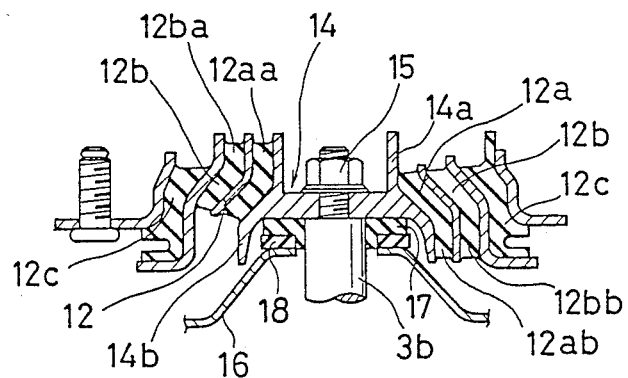
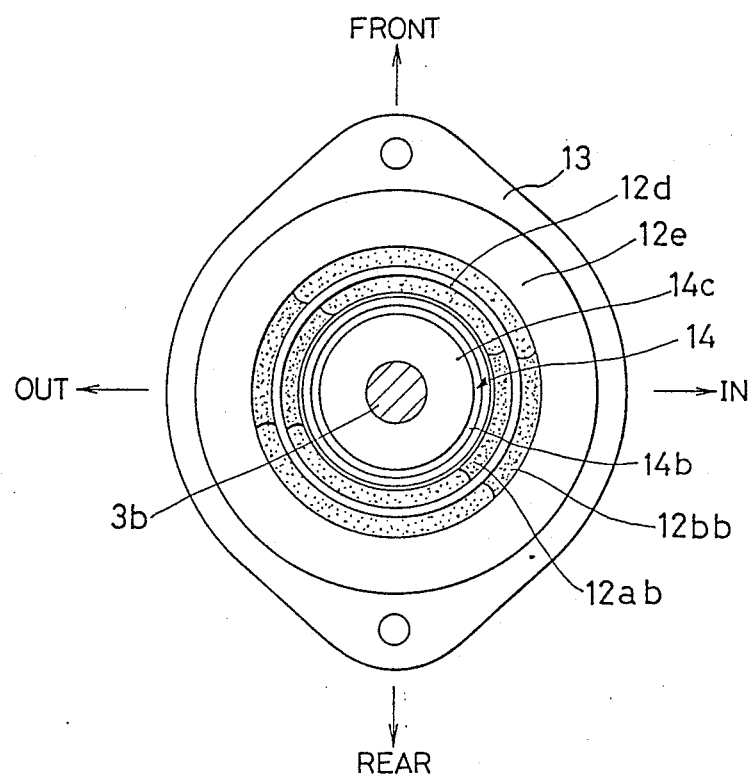

VEHICLE SUSPENSION MECHANISM

BACKGROUND OF THE INVENTION

1. Field of the invention

The present invention relates to a vehicle suspension mechanism, more particularly to a strut suspension mechanism for controlling a camber angle of a vehicle wheel in accordance with vehicle driving condition.

2. Description of the Prior Art

There has been proposed a vehicle suspension mechanism constituted so as to produce a certain change in the camber angle of the vehicle wheel during a cornering operation of the vehicle.

Japanese Patent Public Disclosure No. 61-64506, laid open to the public on Apr. 2, 1986, corresponding to European Patent Publication No. 174,007 discloses a strut suspension mechanism in which an upper end of a piston rod of a strut assembly is connected with a vehicle body through an assist link and a lower end of the strut assembly is connected with a vehicle wheel through a ball joint, a knuckle and the like.

With this structure, in the case where an outer side wheel of the vehicle displaces upwardly relative to the vehicle body when the vehicle is running on a curved path, or the vehicle is in a cornering operation, the strut assembly is urged upwardly so that the upper end of the piston rod of the strut assembly is displaced upwardly and inwardly by means of the assist link. In other words, the upper end of the strut assembly is displaced in a direction oblique to the longitudinal axis of the piston rod so that the strut assembly pivots slightly to the inside about the lower end. This causes pivotal inclination of the vertical axis of the wheel slightly inwardly to produce a negative change in the camber angle of the wheel.

This negative camber angle change during the cornering operation of the vehicle is effected to provide the vehicle with a running stability.

It should be however noted that in the strut suspension disclosed in the Japanese Patent Public Disclosure No. 61-64506, the piston rod of the strut assembly produces a upward displacement in the direction of the longitudinal axis of the piston rod even where one of the wheels climbs a projection on a road during running a straight path as well. This causes the assist link to displace the upper end of the strut assembly in a direction oblique to the longitudinal axis of the piston rod resulting in a negative camber angle change. This means that the strut suspension structure disclosed the Japanese Patent application may produce a negative change in the camber angle of the wheel during a straight driving condition of the vehicle so that the driving stability of the vehicle is deteriorated when the vehicle runs in a straight path.

SUMMARY OF THE INVENTION

It is therefore an object of the invention to provide a vehicle suspension mechanism which can produce a desirable negative change in the camber angle of wheel when the vehicle runs in a curved path and suppress the camber angle change when the vehicle runs in a straight path.

It is another object of the invention to provide a vehicle suspension mechanism which can provide a driving stability during a straight path driving condition of the vehicle as well as a curved path driving condition.

It is further object of the invention to provide a strut suspension mechanism wherein an upper end of a strut assembly is swung slightly inwardly about a lower end thereof only when the vehicle runs a curved path.

According to the present invention, in a vehicle suspension mechanism including a strut assembly connected with a vehicle body at an upper end portion and with a wheel at a lower end portion, a damper axis along which shaft means of the strut assembly is displaced for a damping effect being extended oblique to a kingpin axis about which the wheel is steered so that the shaft means damper shaft is inclined when the wheel is steered to produce a pivotal movement of the kingpin axis around the damper axis, the improvement comprising conversion means provided at the upper end portion of the strut assembly for converting the inclination of the shaft means produced during the steering action of the wheel to a displacement in a transverse direction of the vehicle at the upper end of the strut assembly.

The conversion means can be constituted by resilient means provided between the vehicle body and the shaft means of the strut assembly wherein the resilient means are disposed around the shaft means with different levels and support the upper end of the shaft means of the strut assembly independently. For example, one set of resilient means may be disposed opposite sides of the shaft in a longitudinal direction of the vehicle with substantially same levels with regard to the damper axis of the strut assembly. The other set of the resilient means may be disposed opposite sides of the shaft in a transverse direction of the vehicle with substantially same levels which are different from the levels of the one set of the resilient means.

Alternatively, the conversion means can be constituted by a pair of link means connected with the vehicle body at one end and with the upper end of the shaft means of the strut assembly at the other end. The connecting points of each of the link means are located opposite to those of the other one. The connecting point of the link means to the vehicle body panel is spaced from that to the shaft means with regard to the damper axis. In other words, the link means are extended to cross each other in a direction oblique to the damper axis.

According to features of the present invention, when the vehicle is running in a curved path or the wheel is being steered for a cornering, a steering force causes steering wheels of the vehicle to produce a pivotal movement around the kingpin axis. It should be noted that the damper axis of the strut assembly by which the wheels are resiliently carried is different from the kingpin axis so that the steering action for the wheels causes the shaft means of the strut assembly to rotate around the damper axis and to be exerted on a moment around the upper end portion of the strut assembly. With this operation, the shaft means is rotated about the damper axis relative to the strut assembly so as to absorb or eliminate the rotating force around the shaft means. However, the moment acted on the strut assembly causes a front portion of the shaft means to be dragged downwardly while a rear portion thereof urged upwardly with regard to a traverse section of the shaft means perpendicular to the damper axis in an outer side wheel of steering. This means that there produces a different movement between the front portion and the rear portion of the traverse section of the shaft means in the outer side wheel under the vehicle cornering operation. The present invention is constituted so as to take advantage of this phenomenon.

In a preferred embodiment of the present invention, one set of resilient means are provided between the vehicle body and the shaft means so as to carry the upper end portion of the shaft means in an arrangement that the resilient means are located opposite sides of the shaft means to each other in the longitudinal direction of the vehicle at substantially same positions in level. Similarly the other set of resilient means are arranged opposite sides of the shaft means to each other in the transverse direction of the vehicle at substantially same positions in level. It should be however noted that the one set of the resilient means are located at level positions higher than a moment acting point about which the moment acts on the shaft means during the cornering operation and that the other set of the resilient means are located at level positions lower than the moment acting point. With this structure, upper front resilient means of the one set of the resilient means and lower outer resilient means of the other set of the resilient means are subjected to a shearing force and a compression force in a steering direction to which the wheel is steered.

On the other hand, upper rear resilient means of the one set of the resilient means and lower inner resilient means of the other resilient means are subjected to a shearing force and a tension force in the steering direction.

As a result, the upper end position of the shaft means is displaced inwardly relative to the vehicle body with regard to the traverse direction of the vehicle. This movement of the upper end portion of the shaft means causes a slightly inwardly swingable movement of the strut assembly around the lower end of thereof so that a negative change in the camber angle of the outer wheel is produced during the cornering operation.

This negative camber angle change in the outer wheel is effected to improve the driving stability during the cornering operation.

On the other hand, in the case where the vehicle climbs on an obstacle such as a stone projected from the road surface when the vehicle is running in a straight path, the wheel is urged upwardly relative to the vehicle body so that the strut assembly is compressed along the damper axis. This compression force is transmitted to the shaft means to urge upwardly in the direction of the damper axis. Accordingly, in this operation, no moment acts on the shaft means of the strut assembly and only an axial force acts on the shaft means upwardly so that there is no difference between the front portion of the shaft means and the rear portion thereof in the movement with regard to the traverse section of the shaft means. As a result, although all the resilient means produce upward deformations uniformly because of the axial force, there produces no relative movement of the shaft means to the vehicle body unlike the cornering operation. This means that no camber angle change is produced during the straight path operation of the vehicle.

Meanwhile, the vehicle is bumped in the outer wheel of a steering during the cornering operation so that the shaft means is subjected to the axial force as well as the moment. It should be however noted that the axial force does not affect the camber angle of the wheel.

The resilient means may have any arrangement in which the upper end of the shaft means is displaced inwardly relative to the vehicle body during the cornering operation of the vehicle.

In another aspect of the invention, a pair of link means are pivotally connected with the vehicle body at one end and with the upper end of the shaft means at the other end. In this case the connecting points of the link means to the shaft means are located opposite sides of the shaft means in the longitudinal direction of the vehicle. The connecting points of the link means to the shaft means are positioned higher than those to the vehicle body so that the link means are extended to cross each other in the direction oblique to the damper axis. The moment acting point located on the damper axis between the connecting points to the vehicle body and the connecting points to the shaft means.

As described above, the front portion of the shaft means is displaced downwardly and the rear portion is displaced upwardly during the cornering operation. As a result, front link means of which connecting point to the shaft means is located at the front side of the shaft means is displaced in a manner of reducing the inclination. On the other hand, rear side link means of which connecting point to the shaft means is located at the rear side of the shaft means is displaced in a manner of increasing the inclination so that the upper end portion of the shaft means is displaced inwardly relative to the vehicle body. This causes a negative camber change in the outer wheel of steering during cornering operation as well.

On the other hand, in the case where one of the wheels climbs up a road obstacle such as a stone projecting from the road surface when the vehicle is running in a straight path, the shaft means is subjected to an upward force along the damper axis. It should be however noted that the upward force causes the shaft means to rotate about the damper axis but does not produce a moment against the shaft means. Therefore, any camber angle change is not produced in the wheel during the straight path operation.

The arrangement of the link means can be changed so that the upper end of the shaft means is displaced inwardly relative to the vehicle body during the cornering operation of the vehicle.

The above and other objects and features of the present invention will be apparent from the following description by taking reference with accompanying drawings employed for a preferred embodiment of the present invention.

BRIEF DESCRIPTION OF THE DRAWINGS

FIG. 4 is a sectional view showing the upper end portion of the suspension mechanism taken along a line B—B in FIG. 2;

FIG. 5 is a view of the upper end portion of the suspension mechanism seen from the lower side thereof;

DESCRIPTION OF PREFERRED EMBODIMENTS

Figure 1:
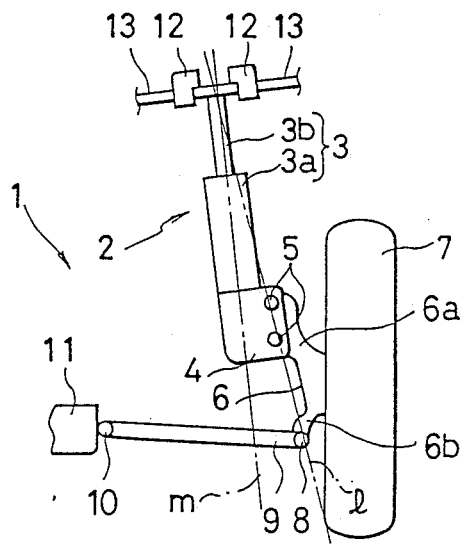
FIG. 1 is a schematic view of a vehicle suspension mechanism in accordance with the present invention.
Figure 2:
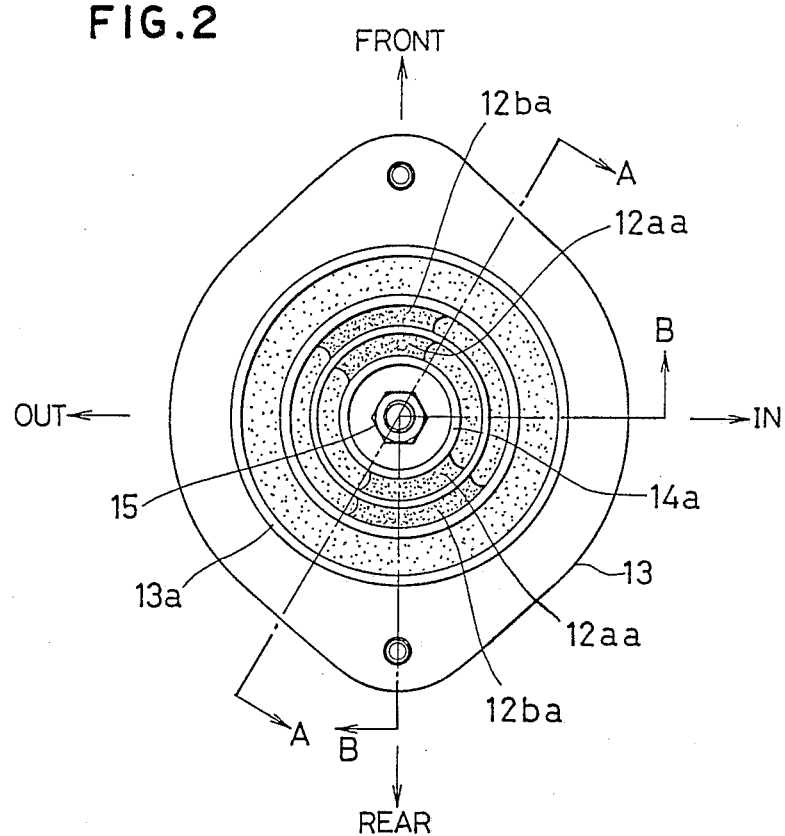
FIG. 2 is a plan view showing an upper end portion of the suspension mechanism where the suspension is mounted on the vehicle body.
Figure 3:
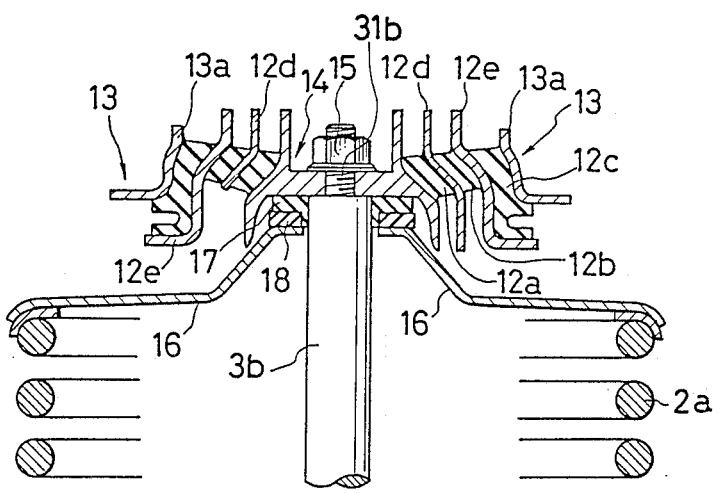
FIG. 3 is a sectional view showing the upper end portion of the suspension mechanism taken along a line A—A in FIG. 2.

Referring to the drawings, specifically to FIG. 1, there is shown a schematic view of a strut suspension mechanism of an automotive vehicle in accordance with the present invention.

The suspension mechanism 1 comprises a strut assembly 2 having a coil spring 2a and a shock absorber 3.

The shock absorber 3 is provided with a cylinder 3a and a piston rod 3b connected with a piston (not shown ) which is slidably inserted in the cylinder 3a. On a lower end of the cylinder 3a is mounted a bracket 4 which is connected with an upper arm 6a of a knuckle 6 of through bolts 5. The knuckle 6 carries a wheel 7 through a wheel hub (not shown).

A lower arm 6b of the knuckle 6 is connected with an outer end of a control link 9 through a lower ball joint 8. The other end of the control link 9 is connected with a vehicle body member 11 through a resilient member 10.

The upper end of the piston rod 3b is connected with a body member 13 of the vehicle through a resilient assembly 12.

Hereinafter, there is described a mounting structure of an upper end portion of the suspension mechanism 1 to the body member 13 taking reference with FIGS. 2 through 5.

The body member 13 is provided with a tubular portion 13a constituting a support means. The upper portion of the piston rod 3b is located at the center of the tubular portion 13a. The piston rod 3b formed with a threaded portion 31b at the top end portion. A bracket 14 is fixed to a shoulder portion of the piston rod 3b formed on an upper end portion thereof through the threaded portion 31b by means of a nut 15. The bracket 14 is formed with a tubular portion 14a extending upwardly, and a skirt portion 14b extending downwardly and a web 14c extending inwardly in the vicinity of a meeting point of the tubular portion 14a and the skirt portion 14b.

The resilient assembly 12 is interposed between the outer surface of the tubular portion 14a and skirt portion 14b of the bracket 14, and the body member 13. The resilient assembly 12 comprises tubular shaped resilient elements 12a, 12b, and 12c, and conical shaped metallic elements 12d and 12e which are expanded downwardly. The resilient element 12a, 12b and 12c and the metallic elements 12d and 12e are coaxially assembled in an overlapped relationship to constitute the resilient assembly 12. The outermost resilient element 12c has a uniform section circumferentially. It should be however noted that the intermediate and innermost resilient elements 12b and 12a are not circumferentially uniform in section. Specifically, as clearly shown in FIG. 4, the intermediate and innermost resilient 12b and 12a are provided respectively with a pair of upper extensions 12ba, 12aa extending upwardly and located opposite sides of the bracket 14 in the substantially longitudinal direction of the vehicle and a pair of lower extensions 12bb, 12ab extending downwardly and located opposite sides of the bracket 14 in the substantially transverse direction of the vehicle.

A spring seat 16 is provided in the vicinity of the lower end of the skirt portion 14b of the bracket 14 for supporting the coil spring 2a of the strut assembly 2. The spring seat 16 is carried by the web 14 of the bracket 14 through bearings 17 and 18 to support the coil spring 2a.

In operation, when the vehicle is in a cornering operation or the wheel 7 is steered, the wheel 7 pivots about the kingpin axis 1 oriented a certain angle away from the damper axis m or axis of the piston rod 3b of the strut assembly 2.

As a result, a moment acts on the piston rod 3b of the strut assembly 2 at the upper end portion connected to the body member 13 through the resilient assembly 12 as well as a rotative force about the damper axis 1. Although the rotative force is absorbed in the assembly to be eliminated, the moment remains to displace the piston rod 3b. The moment causes the piston rod 3b to be displaced downwardly at a front portion thereof and upwardly at a rear portion thereof with regard to the transverse section of the piston rod 3b.

As described hereinafter, the upper extensions 12aa, 12ba and the lower extensions 12ab, 12bb of the resilient elements 12a, 12b substantially affect a camber angle change of the wheel 7 of outer side during steering.

Figure 6:
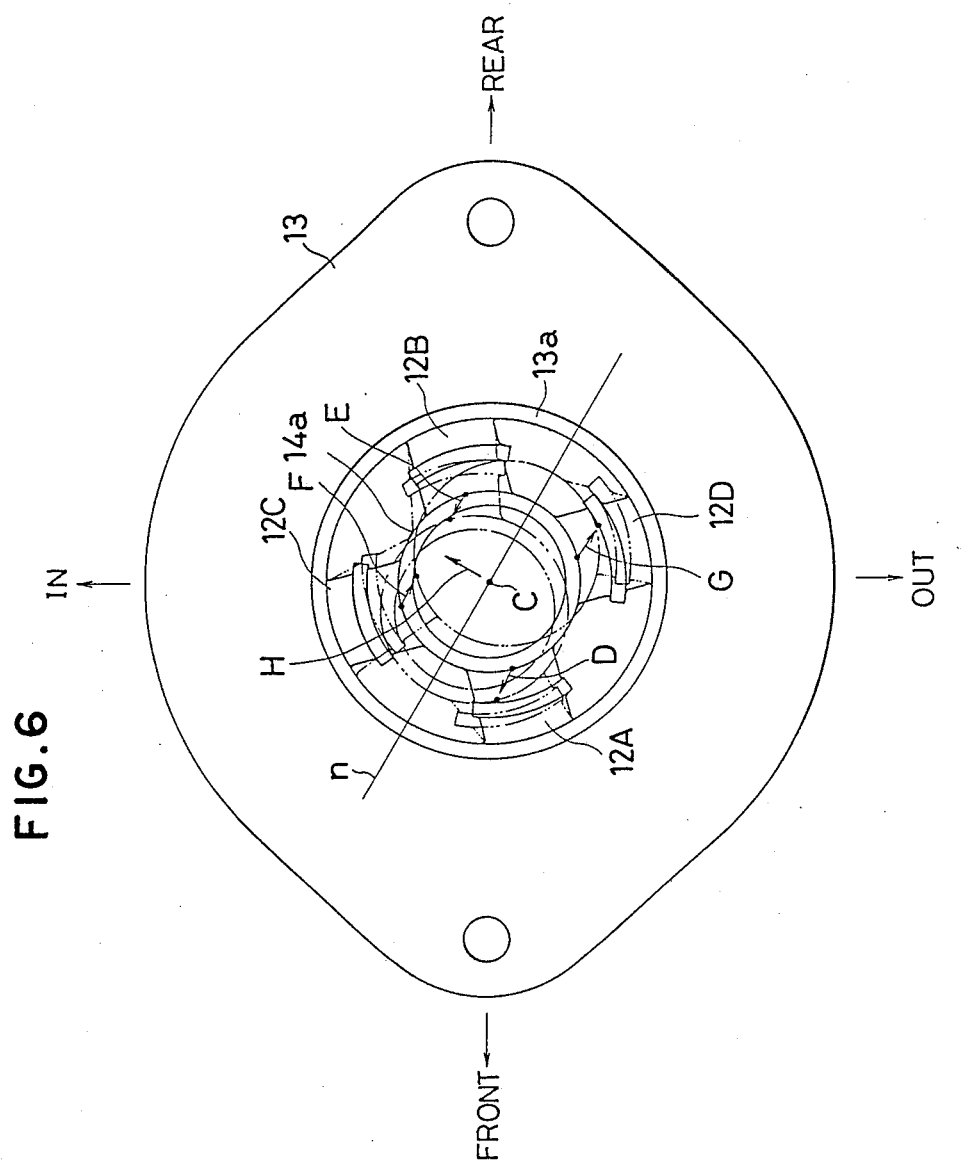
FIG. 6 is a simulation view of the upper end portion of the suspension mechanism showing a deformation of resilient structures disposed around a strut.

FIG. 6 shows a view in which a deformation of the resilient assembly 12 during a cornering operation of the vehicle is simulated.

As far as FIG. 6 is concerned, front upper extensions 12aa, 12ba are referred as a front upper resilient structure 12A. Rear upper extensions 12aa, 12ba are referred as a rear upper resilient structure 12B. Further, inner and outer lower extensions 12ab, 12bb are referred as an inner lower resilient structure 12C and an outer lower resilient structure 12D respectively.

As shown in FIG. 6, The structures 12A, 12B, 12C and 12D are disposed in a circular space formed by the inner surface of the tubular portion 13a of the body member 13 and the outer surface of the tubular portion 14a of the bracket 14 fixed to the piston rod 3b and located spaced from one another in the circumferential direction of the space. The upper resilient structure 12A and 12B are disposed at opposite sides of the tubular portion 14a of the bracket 14 in the substantially longitudinal direction of the vehicle. The lower resilient structures 12C and 12D are disposed at opposite sides of the tubular portion 14a in the substantially transverse direction. The upper and lower structures 12A, 12B and 12C, 12D are spaced from each other in the up and down direction or axial direction of the piston rod 3b.

In this structure, the moment produced by a steering operation of the wheel 7 acts on the piston rod 3b at a point C which is located on the damper axis m and the middle position between the upper and lower resilient structures 12A, 12B and 12C, 12D in the up and down direction. This moment causes the piston rod 3b to incline about a line perpendicular to a line n shown in FIG. 6 passing through the point C. As a result, the piston rod 3b is forced to be displaced forwardly at the upper portion above the point C and rearwardly at the lower portion lower than the point C along the line n. Therefore, the front upper resilient structure 12A is subjected to a force as shown by an arrow D in FIG. 6. Similarly, the other resilient structures 12B, 12C and 12D are subjected to forces as shown by arrows E, F and G in FIG. 6 respectively.

Since the upper side of the point C of the piston rod 3b is displaced in the opposite direction to the lower side of the point C as aforementioned, the front upper resilient structure 12A and outer lower resilient structure 12D are subjected to compression and shearing forces respectively and the rear upper and inner lower resilient structures 12B and 12C are subjected to tension and shearing forces.

Figure 7:
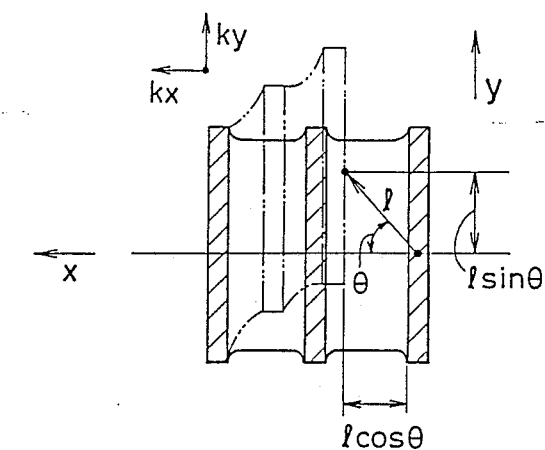
FIG. 7 is a view illustrating a deformation of a resilient structure employed for the suspension mechanism of the present invention.
Figure 8:
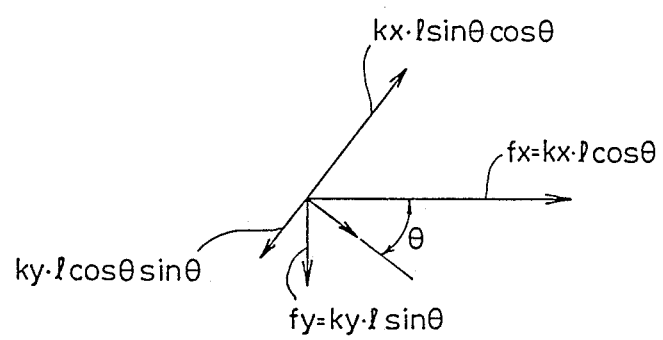
FIG. 8 is a diagram showing directions of counterforces acting on the strut from the resilient structure of FIG. 7.

With regard to the front upper resilient structure 12, there is described a deformation mechanism thereof taking reference with FIG. 7. In FIG. 7, x axis denotes a direction of the compression force and y axis denotes a direction of the shearing force. A sign l shows the amount of displacement of the piston rod 3b in the direction of inclination or the direction along the line n in FIG. 6. An angle $\theta$ show an angle of the x axis to the direction of the inclination of the piston rod 3b. $K_x$, and $K_y$ denote the longitudinal and transverse moduli of elasticity respectively.

Accordingly, a deformation of the structure 12A can be expressed by $l*\cos\theta$ for the direction of the x axis and by $l*\sin\theta$ for the direction of the y axis as shown in FIG. 7 because of the compression force and shearing force transmitted from the piston rod 3b. On the other hand, a counterforce $f_x = l*\cos\theta$ is transmitted from the resilient structure 12A to the piston rod 3b in the direction of the x axis. Concurrently, a counterforce $f_y = l*\sin\theta$ is transmitted to the piston rod 3b in the direction of the y axis. The sum of respective component forces of the counterforces in the direction of the inclination can be expressed by $f_x*\cos\theta + f_y*\sin\theta$. On the other hand, component forces of the counterforces $f_x$ and $f_y$ in a direction perpendicular to the direction of the inclination are $K_x*l*\sin\theta*\cos\theta$ and $K_y*l*\cos\theta*\sin\theta$. these component forces act in the opposite direction each other so that the sum of the component forces in the direction perpendicular to the direction of the inclination can be expressed by $F = l*\sin\theta*\cos\theta*(K_x - K_y)$. It should be noted that where the resilient structure 12A is constituted by a rubber, the relationship between $K_x$ and $K_y$ is $K_x > K_y$ so that the sum of the component forces $K_x$ and $K_y$ acts inwardly on the piston rod 3b in the direction perpendicular to the direction of the inclination of the piston rod 3b.

In conclusion, with regard to the direction of the inclination of the piston rod 3b, the counterforce of the resilient structure 12A shown by $f_x*\cos\theta + f_y*\sin\theta$ acts on the piston rod 3b substantially rearwardly. With regard to the direction perpendicular to the direction of the inclination, the counterforce of the resilient structure 12A shown by $l*\sin\theta*\cos\theta*(K_x - K_y)$ acts on the piston rod 3b substantially inwardly.

As for the rear upper resilient structure 12B, a counterforce acts on the piston rod 3b from the structure 12B as well as the structure 12A in the direction of the inclination. Although the counterforce of the structure 12B has a same magnitude as that of the structure 12A in the direction of the inclination, the sense of the force is opposite to each other so that the counterforces of the structures 12A and 12B negate with each other to be eliminated. However, the counter force of the structure 12B has a same sense and magnitude as that of the structure 12A in the direction perpendicular to the direction of the inclination so that the piston rod 3b is caused to be displaced inwardly by the sum of the counterforces of the structures 12A and 12B in this direction.

Similarly, the inner and outer lower resilient structures produce a counterforce acting on the piston rod 3b inwardly.

As a whole, the piston rod 3b is caused to be displaced inwardly with regard to the transverse direction of the vehicle as shown in FIG. 6 by an arrow H along the line perpendicular to the line n due to the counterforce of the resilient structures 12A, 12B, 12C and 12D. This means that the upper end portion of the piston rod 3b is displaced inwardly at the point C relative to the body member 13 in the direction of the arrow H from the center position of the tubular portion 13a of the body member 13 during the steering operation of the wheel 7.

This inward displacement of the upper end portion of the piston rod 3b in the suspension mechanism 1 of the out side wheel 7 of the curve causes a negative camber angle change in the wheel 7 so that the out side wheel 7 can engage with the road surface with a sufficient frictional force to thereby improve a driving stability during the cornering operation of the vehicle.

When the vehicle is in a straight path driving and the wheel 7 is caused to be displaced upwardly relative to the vehicle body, for example when the wheel 7 climbs on a stone projecting from the road surface, the piston rod 3b is displaced as described below.

In this case, the wheel 7 is forced to be displaced upwardly along the damper axis m which coincides with the longitudinal axis of the piston rod 3b of the strut assembly 2. As a result, the resilient structures 12A, 12B, 12C and 12D are uniformly forced to be displaced upwardly so that there occurs no relative displacement between the upper end portion the piston rod 3b and the tubular portion 13a of the body member 13 in a plane perpendicular to the damper axis m. In other words, the upper end of the piston rod 3b is maintaining at the center of the tubular portion 13a while it is displaced upwardly.

Therefore, this displacement of the upper end portion of the piston rod 3b does not produce a substantial camber angle change in the wheel 7.

In the illustrated embodiment, the resilient elements 12a and 12b are formed with intermediate resilient portions other than the upper and lower extensions respectively. However the intermediate portions are provided symmetrically with regard to the moment acting point C so that the intermediate portions do not affect the camber angle change but function as only usual insulations.

Further, although the illustrated resilient structures are associated with one another to cause the piston rod 3b to be displaced inwardly, it is not necessary to provide a plurality of resilient structure for obtaining such desirable inward displacement of the piston rod but only one or two resilient structures can be constituted so as to produce a counterforce to displace the piston rod 3b inwardly. Where only the resilient structure 12A produces a counterforce which can displace the piston rod 3b inwardly, the other resilient structures may affect the camber angle change in the wheel 7. In addition, The number, shape and arrangement of the resilient element are changeable.

The circumferential position of the resilient structures and distance therebetween in the up and down direction and distance to the moment acting point C therefrom can be controlled so as to change the steering angle in which the maximum camber angle change occurs.

If the resilient structures 12A, 12B and 12C, 12D are reversely mounted with regard to the moment acting point C, a positive camber angle change can be obtained during the cornering operation.

The thickness of the resilient structures 12A, 12B, 12C and 12D can be changed so as to control the magnitude of the camber angle change in the wheel 7 produced during the cornering operation of the vehicle.

Figure 9:
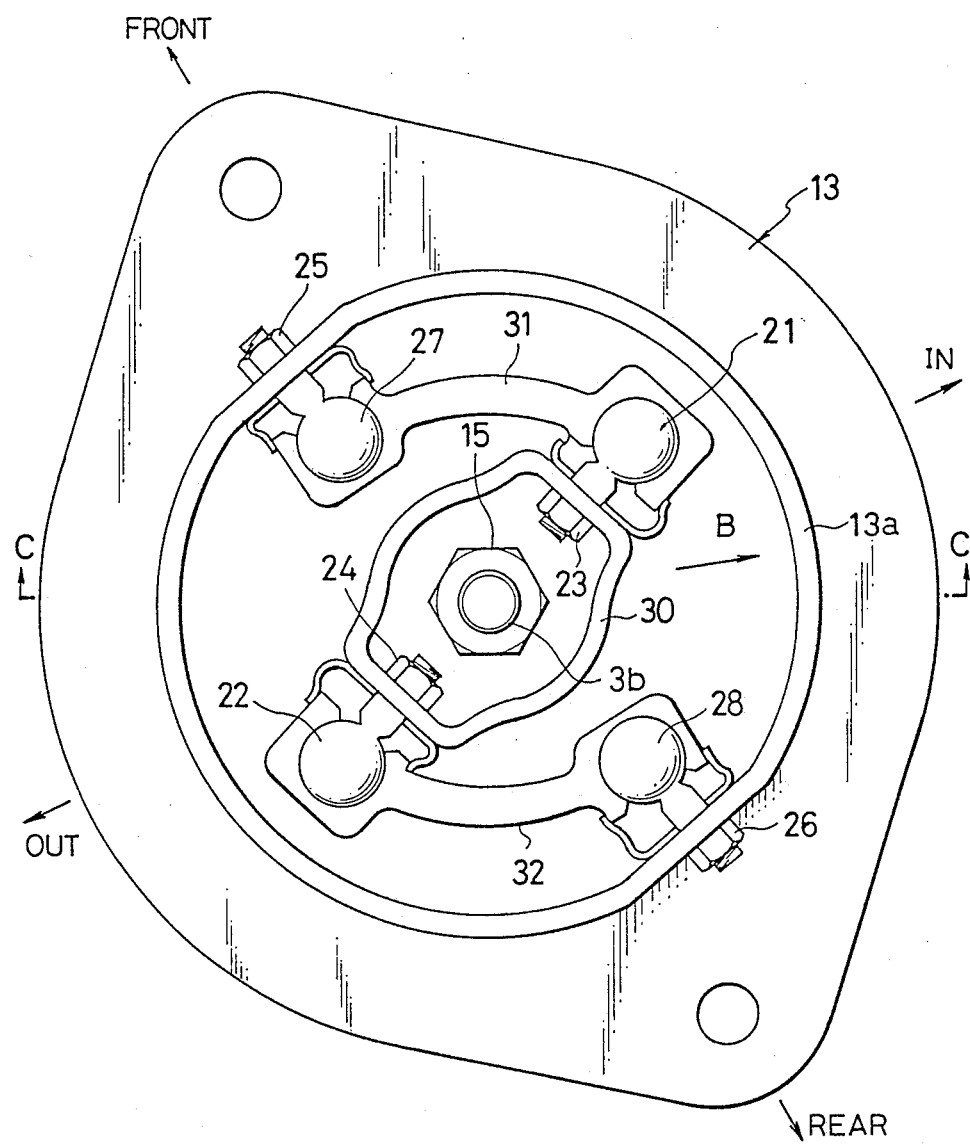
FIG. 9 is a plan view of an upper end portion similar to FIG. 2 but showing a suspension mechanism in accordance with another embodiment.
Figure 10:
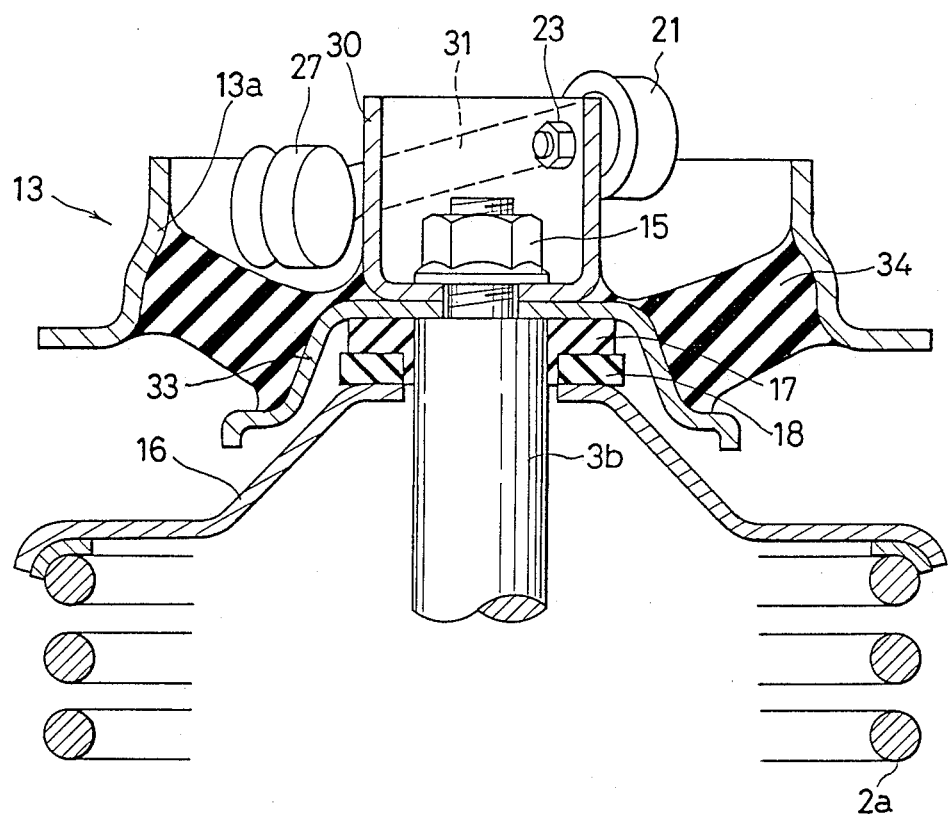
FIG. 10 is a sectional view taken along a line C—C of FIG. 9.
Figure 11:
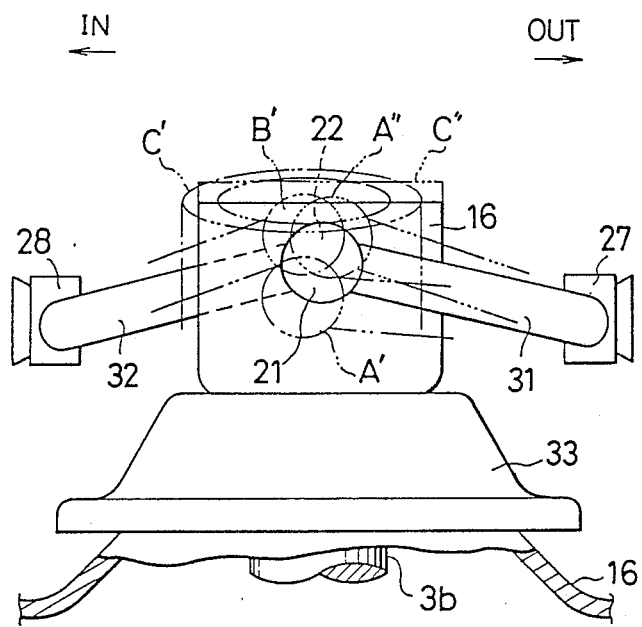
FIG. 11 is a view showing a displacement of link members in the embodiment of the present invention shown in FIG. 9.

Now referring to FIG. 9, 10 and 11, there is shown another embodiment of the present invention.

In this embodiment, the same components as those in the former embodiment are referred to the same numerals as the former embodiment.

As shown in FIG. 9 and 10, in this embodiment, a cup shaped bracket 30 of a substantially rectangle in section and a conical bracket 33 expanded downwardly are fixed to the shoulder portion of the piston rod 3b through the threaded portion formed at the upper portion of the piston rod 3b by means of the nut 15. The bracket 33 is engaged with the resilient member 34 at an upper surface thereof so that the bracket 33 is associated with an inner surface of the tubular portion 13a of the body member 13 to carry the resilient member 34. A pair of ball joints 21, 22 are mounted on the outer surface of the bracket 30 through nuts 23, 24 respectively.

One of the ball joint 21 is located inward of the bracket 30 in the transverse direction of the vehicle. The other of the ball joint 22 is located outward of the bracket 30. Link members 31, 32 are connected with the ball joints 21, 22 at one ends thereof. The other end of the link members 31, 32 are respectively connected a pair of ball joints 27, 28 which are fixed to the inner surface of the tubular portion 13a of the body member 13 at the opposite sides through nuts 25, 26 respectively. As a result, the link member 31, 32 are extended in parallel with each other substantially along the transverse direction of the vehicle. In this arrangement, the connecting point of the link member 31 to the body member 13, that is, the ball joint 27 substantially faces to the connecting point of the link member 32 to the bracket 30, that is the ball joint 22. The ball joint 21 on the bracket 30 for the link member 31 substantially faces to the ball joint 28 on the body member 13 for the link member 32. In other words, the link member 31, 32 are placed symmetrically to each other with regard to the center of piston rod 3b in FIG. 9.

As shown in FIG. 10, the ball joints 21, 22 on the bracket 30 are located higher than the ball joints 27, 28 on the body member 13 with regard to the up and down direction of the piston rod 3b. Therefore, the link members 31, 32 are inclined upwardly toward the connections to the piston rod side.

In this arrangement, when the vehicle is in a cornering operation, the moment produced by the pivotal movement of the wheel 7 about the kingpin axis 1 causes the upper end portion of the piston rod 3b to be displaced downwardly at the front portion and upwardly at the rear portion with regard to the transverse section of the piston. This means that the ball joint 21 of the link member 31 is forced to be displaced downwardly and the ball joint of the link member 22 is forced to be displaced upwardly. As a result, the inner link member 31 pivots about the ball joint 27 on the body member 13 in a direction of reducing the inclination thereof as shown by a phantom line A' of FIG. 11. The outer link member 32 pivots about the ball joint 28 on the body member 13 in a direction of increasing the inclination thereof as shown by a phantom line B' of FIG. 11. This causes the upper end of the piston rod 3b to be displaced inwardly as shown by a phantom line C' of FIG. 11. It will be therefore understood that the upper portion of the piston rod 3b is displaced inwardly along substantially an arrow B in FIG. 9 from the center position of the tubular portion 13a of the body member 13 relative thereto. This inward displacement of the upper portion of the piston rod 3b causes the outerside wheel 7 to produce a negative camber angle change during the cornering operation.

When the vehicle is in a straight path driving and the wheel 7 is forced to be displaced upwardly, the piston rod 3b is also displaced upwardly along the damper axis m so that the ball joint 21, 22 are displaced upwardly as shown by lines A", B" in FIG. 11. Although this causes a slight upward and rotative displacement of the upper end of the piston rod 3b as shown in FIG. 11 by a line C", there is produced no transverse displacement of the piston rod 3b relative to the body member 13. This means that there occurs no camber angle change in the wheel 7 during the straight path driving of the vehicle.

Figure 12:
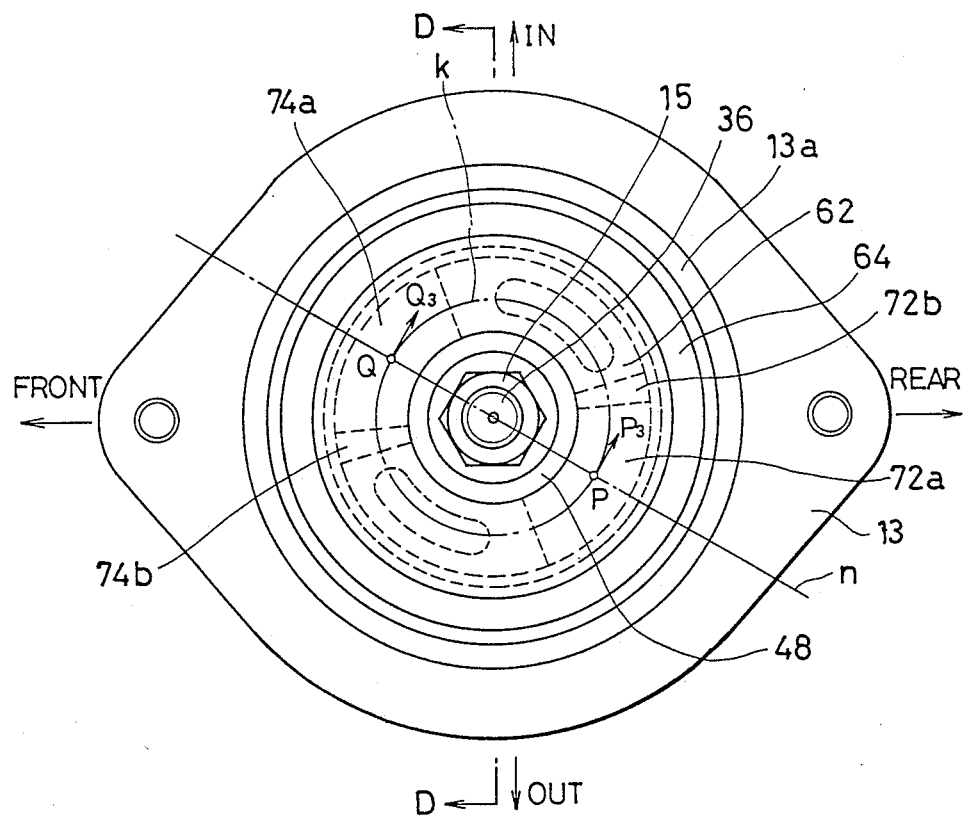
FIG. 12 is a plan view of an upper end portion of a suspension mechanism in accordance with still another embodiment of the present invention.
Figure 14:
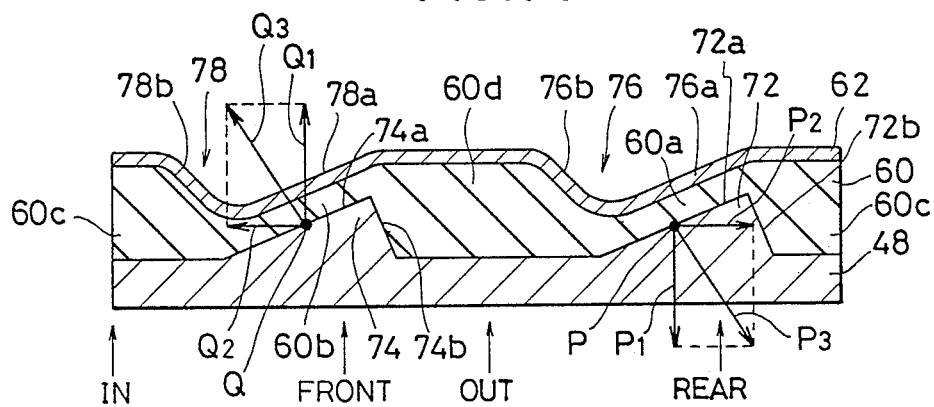
FIG. 14 is a view illustrating a development of an outer surface of a structure taken along a circular line k in FIG. 12.
Figure 13:
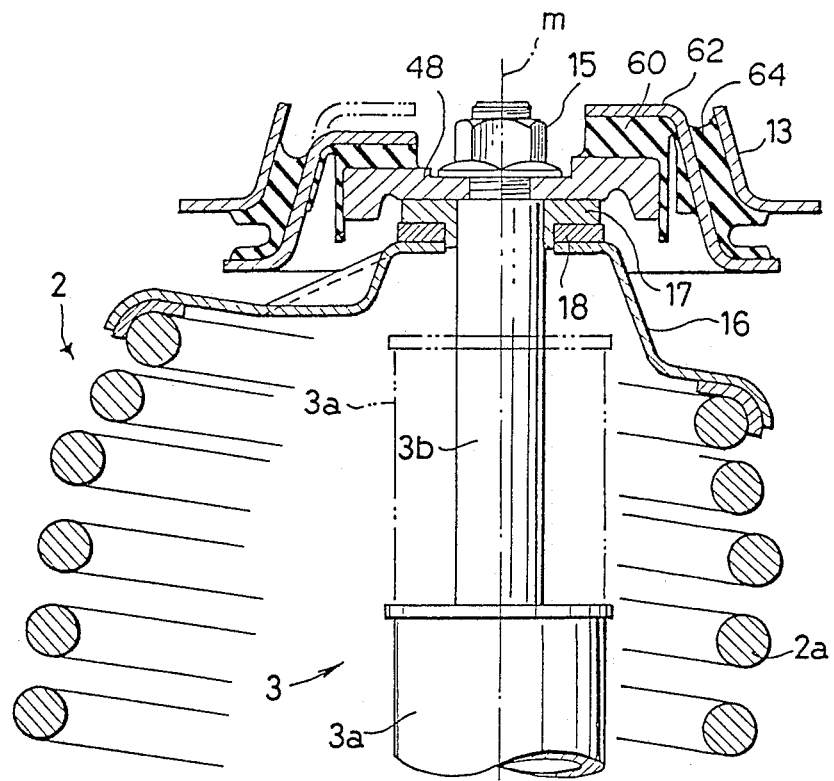
FIG. 13 is a sectional view of the upper end portion of the suspension mechanism taken along a line D—D of FIG. 12.

There is shown a still another embodiment of the present invention in FIGS. 12, 13, 14.

In this embodiment, the same members as the former embodiment are referred as the same numerals as those of the former embodiment and a detailed explanation is omitted.

As shown in FIG. 13, the suspension mechanism in this embodiment is provided a bracket 48 fixed to the upper portion of the piston rod 3b by means of the nut 15.

There are interposed a resilient member 60 usually constituted by a rubber busing and intermediate support member 62 and a resilient member usually constituted by a rubber bushing between the bracket 48 and body member 13.

The resilient member 60, the support member 62 and the resilient member 64 are arranged coaxially with an overlapped relationship in this order.

Therefore, the upper end portion of the piston rod 3b is resiliently supported by the body member 13 through the bracket 48, resilient member 60, support member 62 and resilient member 64. The resilient member 60 has not a uniform thickness circumferentially. As shown in FIG. 12 and 14, the resilient member 60 is formed with a pair of thin portions 60a, 60b at the opposite sides of the piston rod 3b in a direction along the line n in FIG. 12 and a pair of thick portions 60c and 60d at the opposite sides of the piston rod 3b in a direction perpendicular to the line n. This means that the resilient member has an ununiform resilient characteristic with regard to the circumferential direction. The bracket 48 is formed with a pair of projections 72, 74 located corresponding to the thin portions 60a and 60b of the resilient member 60.

The projections 72 and 74 are formed by gentle slopes 72a, 74a and abrupt slopes 72b and 74b respectively. The gentle slope 72a is located at a substantially rear side of the damper axis m with regard to the transverse direction of the vehicle and extended substantially inwardly upwardly in the transverse direction. The gentle slope 74a is located at a substantially front side of the damper axis m and extended substantially outwardly upwardly. The support member 62 is formed with a pair of recesses 76 and 78 located between the thin portions 60a, 60b and thick portions 60c, 60d respectively. The recesses 76 and 78 are formed by gentle slopes 76a, 78b extending substantially in parallel with the gentle slopes 72a, 74a of the projections 72, 74 and abrupt slopes 76b, 78b providing the thick portions 60c, 60d.

In operation, when the vehicle is in the cornering operation, the upper end of the piston rod 3b is displaced downwardly at the front portion and upwardly at the rear portion.

With this operation, there is described hereinafter a displacement of the upper end portion of the piston rod 3b in connection with displacements of points P and Q on the bracket 48 which is displaced together with the upper end portion of the piston rod 3b.

The points P and Q are located on the gentle slopes 72a and 74a of the bracket 48 and on the line n at the opposite sides of the piston rod 3b.

In the point P, the bracket 48 is forced to be displaced upwardly to compress the resilient member 60 at the thin portion 60a so that the bracket 48 is subjected to a force downwardly from the resilient member 60 as a counterforce as shown by an arrow $P_1$. In this case, the counterforce $P_1$ produces a horizontal component force as shown by an arrow $P_2$ because of the slope 72a so that the sum of the counterforces $P_1$ and $P_2$ acts on the point P in a direction shown by an arrow $P_3$ which is directed inwardly with regard to the transverse direction of the vehicle.

On the other hand, in the point Q, the bracket 48 is forced be displaced downwardly to stretch the resilient member 60 at the thin portion 60b so that the bracket 48 is subjected to a force upwardly from the resilient member 60 as a counterforce as shown by an arrow $Q_1$. In this case, the counterforce $Q_1$ produces a horizontal component force as shown by an arrow $Q_2$ because of the slope 72a so that the sum of the counterforces $Q_1$ and $Q_2$ acts on the point P in a direction shown by an arrow $Q_3$ which is also directed inwardly with regard to the transverse direction of the vehicle. These counterforces $P_3$, $Q_3$ cause the upper end portion of the piston rod 3b to be displaced inwardly.

And in the thick portions 60c and 60d of the resilient member 60, there is produced no substantially horizontal force which causes the piston rod 3b to be displaced.

As a whole, the upper end portion of the piston rod 3b is displaced inwardly during the cornering operation of the vehicle.

When the vehicle is in a straight path driving and the wheel 7 is forced to be displaced upwardly, the piston rod 3b is also displaced upwardly along the damper axis m so that the resilient member 60 is deformed upwardly and uniformly. Although this causes a slight upward and rotative displacement of the upper end of the piston rod 3b, there is produced no transverse displacement of the piston rod 3b relative to the body member 13. This means that there occurs no camber angle change in the wheel 7 during the straight path driving of the vehicle.

It will be apparent from the above description that many modifications and variations may be made by those skilled in the art without apart from the scope of the claims as attached.

I claim:

1. In a vehicle suspension mechanism including a strut assembly connected with a vehicle body member at an upper end portion and with a wheel at a lower end portion, a damper axis along which shaft means of the strut assembly is displaced for a damping effect being extended oblique to a kingpin axis about which the wheel is steered so that the shaft means is inclined when the wheel is steered to produce a pivotal movement of the kingpin axis around the damper axis, conversion means provided at the upper end portion of the strut assembly for converting the inclination of the shaft means produced during steering action of the wheel to a displacement in a transverse direction of the vehicle at the upper end portion of the strut assembly, support means provided on the vehicle body member and having an opening in which the shaft means is coaxially located, and resilient guide means interposed between the support means and the shaft means, the resilient guide means being adapted to convert the inclination of the shaft means produced during the steering action of the wheel to a displacement in a transverse direction of the vehicle at the upper end portion of the strut assembly, the resilient guide means being provided with main resilient means and second resilient means extended downwardly from the main resilient means, the second resilient means being located at opposite sides of the shaft means in a transverse direction of the vehicle body member.

2. In a vehicle suspension mechanism including a strut assembly connected with a vehicle body member at an upper end portion and with a wheel at a lower end portion, a damper axis along which shaft means of the strut assembly is displaced for a damping effect being extended oblique to a kingpin axis about which the wheel is steered so that the shaft means is inclined when the wheel is steered to produce a pivotal movement of the kingpin axis around the damper axis, conversion means provided at the upper end portion of the strut assembly for converting the inclination of the shaft means produced during steering action of the wheel to a displacement in a transverse direction of the vehicle at the upper end portion of the strut assembly, support means provided on the vehicle body member and having an opening in which the shaft means is coaxially located, and a pair of link means connected with the support means at one end and with the upper end of the shaft means of the strut assembly at the other end, connecting points of the link means to the support means and the shaft means being arranged in a manner such that the shaft means is swung in a transverse direction of the vehicle body member when the wheel is steered and the shaft means produces a rotative movement when the wheel is displaced along the damper axis.

3. A vehicle suspension mechanism in accordance with claim 2 wherein the connecting points at the other ends of the link means are positioned higher than those at the one ends of the link means so that the link means are extended to cross each other in a direction oblique to the damper axis.

4. A vehicle suspension mechanism in accordance with claim 3 wherein the link means are pivotally connected with the support means at one ends in a longitudinal direction of the vehicle body member and with the shaft means of the strut assembly at the other ends in a transverse direction of the vehicle body member.

5. A vehicle suspension mechanism in accordance with claim 4 wherein first link means is pivotally connected with the support means at one end at a forward position of the shaft means and with the shaft means at the other end at an inward position of the shaft means, and second link means is pivotally connected with the support means at one end at a rearward position of the shaft means and with the shaft means at the other end at an outward position of the shaft means.

6. A vehicle suspension mechanism in accordance with claim 5, resilient means being interposed between the shaft means and the support means.

7. In a vehicle suspension mechanism including a strut assembly connected with a vehicle body member at an upper end portion and with a wheel at a lower end portion, a damper axis along which shaft means of the strut assembly is displaced for a damping effect being extended oblique to a kingpin axis about which the wheel is steered so that the shaft means is inclined when the wheel is steered to produce a pivotal movement of the kingpin axis around the damper axis, conversion means provided at the upper end portion of the strut assembly for converting the inclination of the shaft means produced during steering action of the wheel to a displacement in a transverse direction of the vehicle at the upper end portion of the strut assembly, support means connected with the vehicle body member, and shaft means disposed downward of the support means and connected with the support means through resilient means, the shaft means being formed at an upper surface with a slope which is located at a substantially front side of the damper axis and extended substantially outwardly and upwardly with regard to the transverse direction of the vehicle, the support means being formed at a lower surface with a slope extending substantially in parallel with the slope of the shaft means, the resilient means being interposed between the slopes of the shaft means and support means.

8. A vehicle suspension mechanism in accordance with claim 7 wherein the suspension mechanism is provided with support means connected with the vehicle body member, shaft means disposed downward of the support means and connected with the support means through resilient means, the shaft means being formed at an upper surface with a slope which is located at a substantially rear side of the damper axis and extended substantially inwardly upwardly with regard to the transverse direction of the vehicle, the support means being formed at a lower surface with a slope extending substantially in parallel with the slope of the shaft means, the resilient means being interposed between the slopes of the shaft means and support means.

9. In a vehicle suspension mechanism including a strut assembly connected with a vehicle body member at an upper end portion and with a wheel at a lower end portion, a damper axis along which shaft means of the strut assembly is displaced for a damping effect being extended oblique to a kingpin axis about which the wheel is steered so that the shaft means is inclined when the wheel is steered to produce a pivotal movement of the kingpin axis around the damper axis, conversion means provided at the upper end portion of the strut assembly for converting the inclination of the shaft means produced during steering action of the wheel to a displacement in a transverse direction of the vehicle at the upper end portion of the strut assembly, and support means connected with the vehicle body member, shaft means disposed downward of the support means and connected with the support means through resilient means, the shaft means being formed at an upper surface with a slope which is located at a substantially rear side of the damper axis and extended substantially inwardly and upwardly with regard to the transverse direction of the vehicle, the support means being formed at a lower surface with a slope extending substantially in parallel with the slope of the shaft means, the resilient means being interposed between the slopes of the shaft means and support means.

10. In a vehicle suspension mechanism having a steerable wheel and defining a kingpin axis about which the wheel is steered, a damping strut assembly connected with the wheel at its lower end, a resilient connection comprising resilient means connecting the upper end of the damping strut assembly to a vehicle body member to allow for resilient deformation, said damping strut assembly defining a damper axis along which the damping strut assembly is displaced during damping, the damper axis being inclined obliquely to the kingpin axis about which the wheel is steered so that the damper axis pivots around the kingpin axis when the wheel is steered, the improvement comprising camber control means imposed upon the resilient connection between the top of the damping strut assembly and the vehicle body member for controlling displacement of the damper axis to occur only during cornering of the vehicle when the steerable wheel is steered and only toward the transversely inner direction of the vehicle at the upper end of the damping strut assembly for the wheel at an outboard side of the cornering curvature to produce a predetermined negative camber of the wheel, and the prevent negative camber from being produced for the wheel as a consequence of the wheel striking a projection when the vehicle is running in a straight path when the steerable wheel is not steered, said damping strut assembly including a rigid member at the top of the damping strut assembly, said camber control means including connecting means for connecting said rigid member to one of said resilient means and said vehicle body member so that said rigid member is shifted toward the transversely inner direction with respect to the vehicle body member in response to an inclinatory movement of said damper axis about said kingpin axis when said wheel is steered.

11. A vehicle suspension mechanism in accordance with claim 10 wherein said connecting means includes a plurality of connecting members each for connecting the rigid member with said one of said resilient means and the vehicle body member.

12. A vehicle suspension mechanism in accordance with claim 11 wherein said rigid member includes a portion which is offset vertically with respect to a connecting portion where the upper end of the damping strut assembly is connected through said resilient means with said vehicle body member, said connecting means connecting said portion of said rigid member to said one of said resilient means and said vehicle body member.

13. A vehicle suspension mechanism in accordance with claim 12 wherein said rigid member includes portions extending vertically upward and vertically downward with respect to said connecting portion, said connecting means including upper and lower connecting means for connecting respectively the vertically upward and vertically downward extending portions of said rigid member to said one of said resilient means and said vehicle body member.

14. A vehicle suspension mechanism in accordance with claim 11 wherein said connecting means includes guide links having pivot means at opposite ends.

15. A vehicle suspension mechanism in accordance with claim 11 wherein said plurality of connecting members are arranged symmetrically with respect to said damper axis.

16. A vehicle suspension mechanism in accordance with claim 10 wherein said rigid member includes a portion which is diametrically spaced from said damper axis, said connecting means connecting said rigid member portion with said one of said resilient means and said vehicle body member.

17. A vehicle suspension mechanism in accordance with claim 16 wherein said rigid member portion which is diametrically spaced from said damper axis is located forwardly with respect to said damper axis, said connecting means being connected with said rigid member portion which is diametrically spaced from said damper axis such that said rigid member portion is moved downward and transversely inward in response to a forward inclinatory movement of said damper axis.

18. A vehicle suspension mechanism in accordance with claim 10 wherein said connecting means comprises a resilient member.

19. A vehicle suspension mechanism in accordance with claim 10 wherein said rigid member includes an open-top cylindrical member, said connecting means including a pair of link members each having opposite end portions connected through pivotable joint means respectively with said cylindrical member and the vehicle body member.

20. A vehicle suspension mechanism in accordance with claim 10 wherein said rigid member includes a disc member, said vehicle body member including a portion thereof located directly above said disc member, said connecting means including resilient members disposed between said disc member and said vehicle body member, said disc member having an upper surface provided at portions forward and rearward of said damper axis with first slopes, said vehicle body member having a lower surface confronting said first slopes with second slopes which are respectively parallel to the first slopes, said resilient members being disposed between the first slopes and the second slopes.

21. In a vehicle suspension mechanism having a steerable wheel and defining a kingpin axis about which the wheel is steered, a damping strut assembly connected with the wheel at its lower end, a resilient connection comprising resilient means connecting the upper end of the damping strut assembly to a vehicle body member to allow for resilient deformation, said damping strut assembly defining a damper axis along which the damping strut assembly is displaced during damping, the damper axis being inclined obliquely to the kingpin axis about which the wheel is steered so that the damper axis pivots around the kingpin axis when the wheel is steered, camber control means imposed upon the resilient connection between the top of the damping strut assembly and the vehicle body for controlling displacement of the damper axis to occur only during cornering of the vehicle and only toward the transversely inner direction of the vehicle at the upper end of the damping strut assembly to produce a predetermined negative camber of the wheel, and the prevent negative camber being produced for the wheel as a consequence of the wheel striking a projection when the vehicle is running in a straight path, a rigid member at the top of the damping strut assembly, said camber control means including connecting means for connecting said rigid member to one of said resilient means and said vehicle body, portions of said connecting means being axially spaced relative to the damping axis, and said connecting means cooperating with said resilient means to effect and displacement, said portions of said connecting means being a pair of ball joints interconnected by a rigid link peripherally spaced about the damping axis.

22. A vehicle suspension mechanism in accordance with claim 21 wherein said portions are two pair of ball joints peripherally equally spaced about the damping axis, each pair of ball joints being connected together by a rigid link, one ball joint of each pair being connected to the vehicle body and the other ball joint of each pair being connected to the top of the damping strut assembly, the ball joints connected to the top of the damping strut assembly being axially spaced from the ball joints connected to the vehicle body relative to the damping axis.

23. In a vehicle suspension mechanism having a steerable wheel and defining a kingpin axis about which the wheel is steering, a damping strut assembly connected with the wheel at its lower end, a resilient connection comprising resilient means connecting the upper end of the damping strut assembly to a vehicle body member to allow for resilient deformation, said damping strut assembly defining a damper axis along which the damping strut assembly is displaced during damping, the damper axis being inclined obliquely to the kingpin axis about which the wheel is steered so that the damper axis pivots around the kingpin axis when the wheel is steered, camber control means imposed upon the resilient connection between the top of the damping strut assembly and the vehicle body for controlling displacement of the damper axis to occur only during cornering of the vehicle and only toward the transversely inner direction of the vehicle at the upper end of the damping strut assembly to produce a predetermined negative camber of the wheel, and to prevent negative camber being produced for the wheel as a consequence of the wheel striking a projection when the vehicle is running in a straight path, a rigid member at the top of the damping strut assembly, said camber control means including connecting means for connecting said rigid member to one of said resilient means and said vehicle body, portions of said connecting means being axially spaced relative to the damping axis, and said connecting means cooperating with said resilient means to effect said displacement, said portions of said connecting means being second resilient means peripherally spaced about the damping axis.

24. A vehicle suspension mechanism in accordance with claim 23 wherein four resilient members constitute the second resilient means, two diametrically opposed resilient members being axially spaced from the other two diametrically opposed resilient members relative to the damping axis.

25. A vehicle suspension mechanism in accordance with claim 23 wherein the second resilient means is a profiled resilient element having diametrically opposed ramps relative to the damping axis with the resilient element connected between the top of the damping strut assembly and the first-mentioned resilient means.

* * * * *